(12) United States Patent  (10) Patent No.: US 7,243,679 B2
Thelen  (45) Date of Patent: Jul. 17, 2007

(54) ADSORBENT FRACTIONATOR DIRECTIONAL FLOW CONTROL VALVE ASSEMBLY APPARATUS AND METHOD

(75) Inventor: John E. Thelen, Ocala, FL (US)

(73) Assignee: Flair Corporation, Ocala, FL (US)

( * ) Notice: Subject to any disclaimer, the term of this patent is extended or adjusted under 35 U.S.C. 154(b) by 305 days.

(21) Appl. No.: 11/015,022

(22) Filed: Dec. 20, 2004

(65) Prior Publication Data

US 2006/0130905 A1 Jun. 22, 2006

(51) Int. Cl.
*F16K 11/20* (2006.01)
*F16K 27/02* (2006.01)

(52) U.S. Cl. ............... 137/596; 91/465; 137/596.17; 137/599.14

(58) Field of Classification Search ............... 137/106, 137/309, 596, 596.17, 625.27, 599.14, 597; 91/465
See application file for complete search history.

(56) References Cited

U.S. PATENT DOCUMENTS

| 4,247,311 A | | 1/1981 | Seibert et al. ............... 55/163 |
| 4,322,223 A | * | 3/1982 | Christel, Jr. ............... 95/26 |
| 6,112,767 A | * | 9/2000 | Pinkham ............... 137/597 |

* cited by examiner

*Primary Examiner*—Stephen M. Hepperle
(74) *Attorney, Agent, or Firm*—Baker & Hostetler LLP

(57) ABSTRACT

An adsorbent fractionator directional flow control valve assembly includes two inlet valves, two exhaust valves, and a valve body. The valve assembly controls the directional flow of an influent gas mixture into one of two vertical desiccant tanks of an adsorbent fractionator, or desiccant dryer, and an effluent gas flowing in reverse through the opposite desiccant tank. The valve body is a single unitary piece, which may be a casting, and couples the inlet valves and the exhaust valves, which may be four identical valve subassemblies, providing flow communication between these and an inlet port, two exit ports, and an exhaust port.

21 Claims, 3 Drawing Sheets

ADSORBENT FRACTIONATOR DIRECTIONAL FLOW CONTROL VALVE ASSEMBLY APPARATUS AND METHOD

FIELD OF THE INVENTION

The present invention relates generally to valves. More particularly, the present invention relates to pneumatic directional flow control valves for adsorbent fractionators.

BACKGROUND OF THE INVENTION

An adsorbent fractionator is an apparatus that receives a mixture of two or more gases and separates part or all of one of these gases from the mixture by passing the gas mixture over an adsorbent bed. One type of adsorbent fractionator, or desiccant dryer, configures two vertical desiccant tanks to alternately receive an influent gas with moisture from a common inlet source. The influent gas mixture is cyclically routed through one desiccant tank during one adsorption cycle, and then through the second desiccant tank for one adsorption cycle. During portions of this cycle, a fraction of the effluent gas from the tank currently in the adsorption cycle is rerouted through the opposite tank in the reverse direction in order to regenerate the desiccant bed. Thus, a series of valves are required to control the direction and flow of the influent adsorption cycle gas mixture and the effluent regeneration cycle gas.

In certain desiccant dryers, a series of inlet valves receives from an inlet source an influent gas with moisture to be removed, and routes that gas mixture to the desiccant tank currently in the adsorption cycle. Simultaneously, a series of exhaust valves receives the effluent gas from the opposite desiccant tank, which is in the regeneration cycle, and routes the effluent gas through an exhaust port and eventually to the atmosphere. Thus, at any given time, one of the two inlet valves is open, allowing the influent gas to pass through to one of the two desiccant tanks. In addition, one of the two exhaust valves may also be open to allow effluent gas to exhaust to the atmosphere after passing through the opposite desiccant tank in the reverse direction.

While the foregoing systems are useful, improvements are still desirable. For example, the existing systems can require a multiplicity of valve assemblies, or multiple valve bodies to hold multiple valves, to control the direction and flow of the gases. The existing systems also are limited to some extent by their method of manufacture, which involves multiple machining and assembly steps, resulting in relatively high production costs and a heavier product than is desirable. Furthermore, machining limitations may result in the existing systems having a less aerodynamically efficient internal flow path than desired.

Accordingly, it is desirable to provide a directional flow control valve assembly with a reduced number of pieces that is able to accept one or more identical valves for use in an adsorbent fractionator. It also is desirable that the valve assembly be lighter in weight and have an aerodynamically efficient internal flow path. Furthermore, it is desirable to have a valve body that is easy and less costly to manufacture.

SUMMARY OF THE INVENTION

The foregoing needs are met, to a great extent, by the present invention, wherein in one aspect an apparatus is provided that in some embodiments provides a directional flow control valve assembly with a reduced weight one-piece valve body for use in an adsorbent fractionator. In another aspect, at least in some embodiments, the valve body further provides mounting interfaces for four identical valves. In yet another aspect, the valve body is fabricated from a casting.

In accordance with one aspect of the present invention, a directional flow control valve assembly for an adsorbent fractionator is provided having a first inlet valve and a second inlet valve. The valve assembly also has a first exhaust valve and a second exhaust valve. In addition, the valve assembly has a valve body. The valve body includes at least one inlet port pneumatically coupled to a first valve chamber and to a second valve chamber, a first exit port pneumatically coupled to the first valve chamber, a first mounting interface for coupling a first inlet valve, a second exit port pneumatically coupled to the second valve chamber, a second mounting interface for coupling a second inlet valve, at least one exhaust port pneumatically coupled to a third valve chamber and to a fourth valve chamber, a third mounting interface for coupling a first exhaust valve, and a fourth mounting interface for coupling a second exhaust valve. Furthermore, the third valve chamber is pneumatically coupled to the first valve chamber, the fourth valve chamber is pneumatically coupled to the second valve chamber, and the valve body comprises a single unitary piece. In addition, the valve body may also include a fifth mounting interface for an inlet manifold, and the valve body may comprise a single unitary casting.

In accordance with another aspect of the present invention, a valve body for pneumatic directional flow control valves in an adsorbent fractionator includes at least one inlet port pneumatically coupled to a first valve chamber and to a second valve chamber. The valve body also has a first exit port pneumatically coupled to the first valve chamber and a second exit port pneumatically coupled to the second valve chamber. In addition, the valve body has a first mounting interface for coupling a first inlet valve, and a second mounting interface for coupling a second inlet valve. The valve body also has at least one exhaust port pneumatically coupled to a third valve chamber and to a fourth valve chamber. Furthermore, the valve body includes a third mounting interface for coupling a first exhaust valve, and a fourth mounting interface for coupling a second exhaust valve. In this valve body, the third valve chamber is pneumatically coupled to the first valve chamber, and the fourth valve chamber is pneumatically coupled to the second valve chamber. Additionally, the valve body comprises a single unitary piece.

Further in accordance with this aspect, flow communication may be provided by a first interconnecting passage between the inlet port and the first valve chamber. Flow communication between the inlet port and the second valve chamber may be provided by a second interconnecting passage. Additionally, flow communication may be provided by a third interconnecting passage between the first exit port and the first valve chamber. A fourth interconnecting passage may provide communication between the second exit port and the second valve chamber. Likewise, flow communication may be provided between the first valve chamber and the third valve chamber by a fifth interconnecting passage. A sixth interconnecting passage may provide flow communication between the second valve chamber and the fourth valve chamber. Furthermore, a seventh interconnecting passage may provide flow communication between the exhaust port and the third valve chamber. Flow communication between the exhaust port and the fourth valve chamber may be provided by an eighth interconnecting passage.

It can thus be understood that in accordance with this aspect a portion of the first valve chamber wall at the periphery of the first interconnecting passage may form a first valve seat for the first inlet valve. Likewise, a portion of the second valve chamber wall at the periphery of the second interconnecting passage may provide a second valve seat for the second inlet valve. A portion of the third valve chamber wall at the periphery of the fifth interconnecting passage may provide a third valve seat for the first exhaust valve. Furthermore, a portion of the fourth valve chamber wall at the periphery of the sixth interconnecting passage may provide a fourth valve seat for the second exhaust valve.

Further in accordance with this aspect, the second mounting interface may face opposite the first mounting interface. In addition, the third and fourth mounting interfaces may be perpendicular to the first and second mounting interfaces, and the third and fourth mounting interfaces may lie in a same plane. Furthermore, the valve body may be a single unitary casting. The valve body also may include a fifth mounting interface for an inlet manifold. Moreover, the first, second, third and fourth mounting interfaces may be capable of accepting identical valve subassemblies. Additionally, the angled periphery of the interconnecting passage intersections each constitute a radius greater than one-tenth of an inch, and the angles between the centerlines of all intersecting interconnecting passages are 90 degrees or greater.

In accordance with yet another aspect of the present invention, a method of fabricating a single unitary valve body for pneumatic directional flow control valves in an adsorbent fractionator comprises the steps of creating a casting mold, pouring molten metal into the casting mold, allowing the metal to solidify, removing the casting mold, and machining finished mounting interface surfaces. The casting mold is configured to form integral to the valve body at least one inlet port pneumatically coupled to a first valve chamber and to a second valve chamber. The casting mold also is configured to form integral to the valve body a first exit port pneumatically coupled to the first valve chamber and a second exit port pneumatically coupled to the second valve chamber. In addition, the casting mold is configured to form a first mounting interface for coupling a first inlet valve, and a second mounting interface for coupling a second inlet valve. The casting mold is further configured to form at least one exhaust port pneumatically coupled to a third valve chamber and to a fourth valve chamber. Furthermore, the casting mold forms a third mounting interface for coupling a first exhaust valve, and a fourth mounting interface for coupling a second exhaust valve. Additionally, the casting mold is configured such that the third valve chamber is pneumatically coupled to the first valve chamber. Likewise the casting mold is configured such that the fourth valve chamber is pneumatically coupled to the second valve chamber.

In still another aspect in accordance with the present invention, a valve body for pneumatic directional flow control valves in an adsorbent fractionator includes means for pneumatically coupling at least one inlet port to a first valve chamber and to a second valve chamber, means for pneumatically coupling a first exit port to the first valve chamber, mounting interface means for coupling a first inlet valve, means for pneumatically coupling a second exit port to the second valve chamber, mounting interface means for coupling a second inlet valve, means for pneumatically coupling at least one exhaust port to a third valve chamber and to a fourth valve chamber, mounting interface means for coupling a first exhaust valve, mounting interface means for coupling a second exhaust valve, means for pneumatically coupling the third valve chamber to the first valve chamber, and means for pneumatically coupling the fourth valve chamber to the second valve chamber. Furthermore, the valve body is a single unitary piece, which may comprise a casting.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
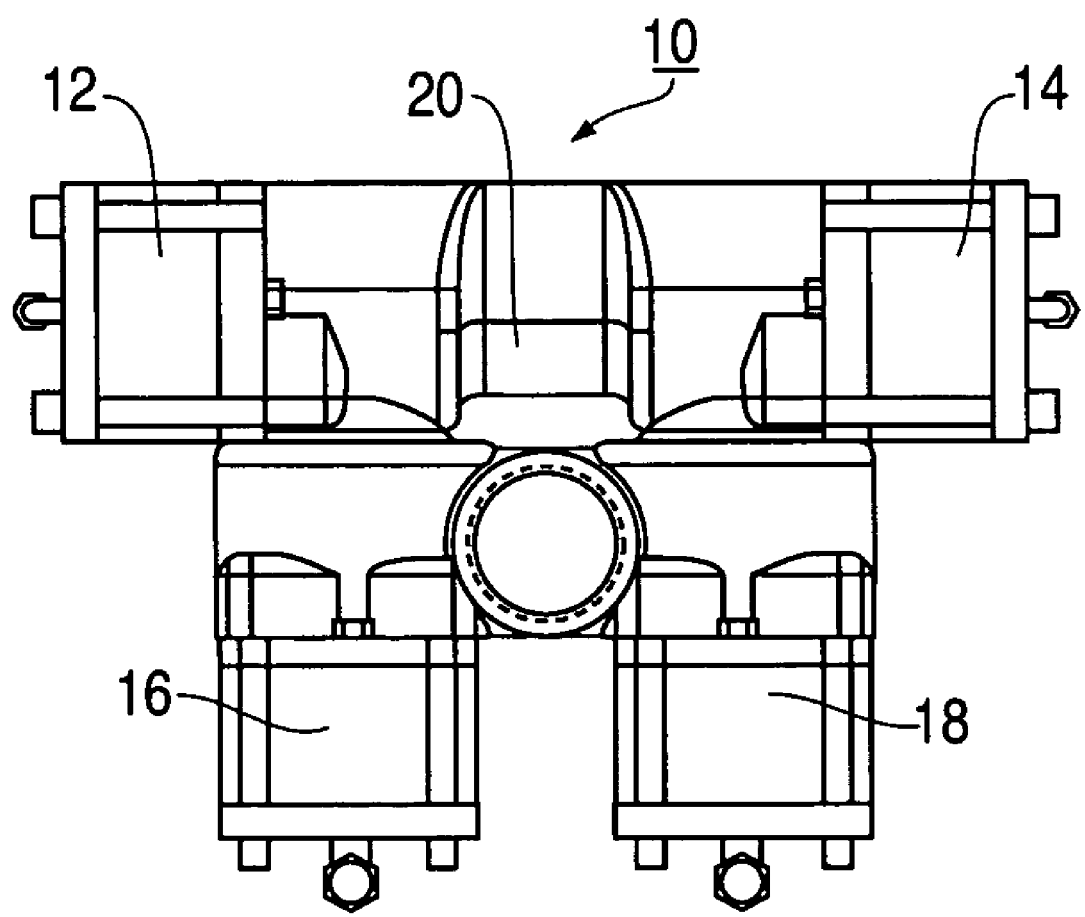
FIG. 1 provides a plan view illustrating a valve assembly according to a preferred embodiment of the present invention.

Various embodiments of the present invention provide a directional flow control valve assembly with a one-piece valve body for use in an adsorbent fractionator. In some embodiments the valve body provides mounting interfaces for four identical valves. Additionally, in some embodiments the valve body may be fabricated from a casting. Embodiments of the invention will now be described with reference to the drawing figures, in which like reference numerals refer to like parts throughout.

An embodiment of the present inventive apparatus and method is illustrated in FIG. 1, which depicts a directional flow control valve assembly 10, which includes four pneumatic valves: a first inlet valve 12, a second inlet valve 14, a first exhaust valve 16, and a second exhaust valve 18. The valve assembly 10 also includes a one-piece cast valve body 20, which couples the two inlet valves 12, 14 and the two exhaust valves 16, 18. Each of the four inlet and exhaust valves 12, 14, 16, 18 may in some embodiments preferably consist of an identical valve subassembly. The valve assembly 10 controls the directional flow of gases in an adsorbent fractionator, an apparatus that receives a mixture of two or more gases and separates part or all of one of these gases from the mixture by passing the gas mixture over an adsorbent bed.

The valve assembly 10 controls the directional flow of gases in a type of adsorbent fractionator, or desiccant dryer, that configures two vertical desiccant tanks to alternately receive an influent gas mixture from a common inlet source. A variety of features of a flow control system for an adsorbent fractionator of this type is disclosed in U.S. Pat. No. 4,247,311, the disclosure of which is hereby incorporated by reference in its entirety. Referring again to FIG. 1, the valve assembly cyclically routes the influent gas mixture through one desiccant tank by way of one of the inlet valves 12, 14 during one adsorption cycle, and then through the second desiccant tank by way of the opposite inlet valve 12, 14 for one adsorption cycle. In order to regenerate the desiccant bed, during portions of the cycle a fraction of the effluent gas from the tank currently in the adsorption cycle is rerouted through the opposite tank in the reverse direction and is released to the atmosphere through the exhaust valve 16, 18 corresponding to the inlet valve 12, 14 that is currently closed.

The valve assembly 10 receives an influent gas with moisture to be removed from an inlet source, and routes that gas to the desiccant tank currently in the adsorption cycle, while simultaneously receiving the effluent gas from the opposite desiccant tank, which is in the regeneration cycle, and routing the effluent gas through an exhaust port and eventually to the atmosphere. Thus, at any given time, one of the two inlet valves 12, 14 is open, allowing the influent gas to pass through to one of the two adsorbent fractionator tanks. In addition, one of the two exhaust valves 16, 18 may also be open to allow effluent gas to exhaust to the atmosphere after passing through the opposite desiccant tank in the reverse direction.

Figure 2:
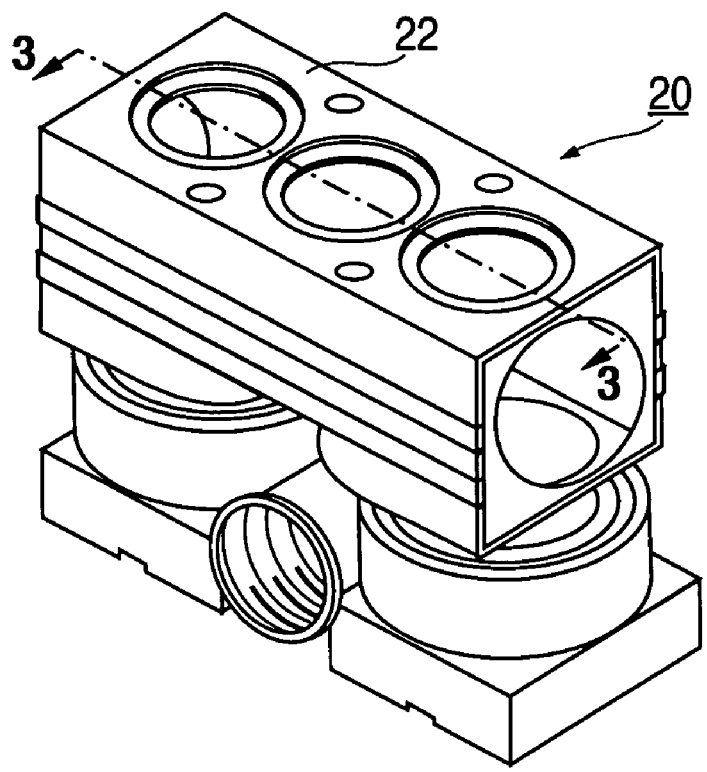
FIG. 2 provides a perspective view illustrating a valve body compatible with the valve assembly in FIG. 1.
Figure 3:
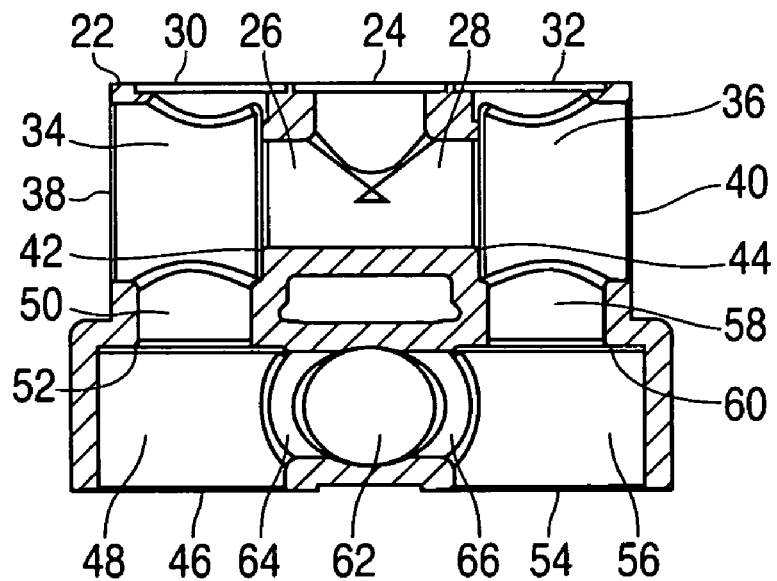
FIG. 3 provides a cross-sectional view, taken through line 3—3 in FIG. 2, illustrating the valve body.

The valve body 20 is shown in isolation in FIG. 2. (FIG. 2 shows the exterior of the valve body 20 with flat sides, whereas FIG. 1 shows the valve body 20 with a contoured exterior generally conforming to the shape of the interior walls of the valve body 20, such as results from a casting process.) The valve body 20 attaches to an inlet manifold, which is connected to both desiccant tanks, by way of a mounting interface 22. A cutaway view of the valve body, Section 3—3, is shown in FIG. 3. (Note that FIG. 3 is viewed from the opposite direction of FIG. 1.) The influent gas enters the valve body by way of an inlet port 24, and passes through either interconnecting flow passage 26 or interconnecting flow passage 28 to reach either exit port 30 or exit port 32, by way of either inlet valve chamber 34 or inlet valve chamber 36, depending on which of the inlet valves 12, 14 is open at the time.

Inlet valve 14 attaches to the valve body by way of mounting interface 38, and the planar wall of valve chamber 34 at the periphery of passage 26 acts as a valve seat 42 for the inlet valve 14. Likewise, inlet valve 12 attaches to the valve body by way of mounting interface 40, and the planar wall of the valve chamber 36 at the periphery of passage 28 provides a valve seat 44 for the inlet valve 12. Thus, the influent gas entering through the inlet port 24 may be routed to either exit port 30 or to exit port 32, from which the coupled inlet manifold passes the influent air to the corresponding desiccant tank.

Exhaust valve 18 attaches to the valve body by way of mounting interface 46, and the planar wall of valve chamber 48 at the periphery of interconnecting flow passage 50 acts as a valve seat 52 for the exhaust valve 18. Likewise, exhaust valve 16 attaches to the valve body by way of mounting interface 54, and the planar wall of valve chamber 56 at the periphery of interconnecting flow passage 58 acts as a valve seat 60 for the exhaust valve 16. Thus, effluent gas passing through the opposite desiccant tank in the reverse direction may flow into the valve body 20 from the coupled inlet manifold through the corresponding exit port 30, 32, inlet valve chamber 34, 36, and interconnecting flow passage 50, 58. If the corresponding exhaust valve 16, 18 is open, the effluent gas then passes through the corresponding exhaust valve chamber 48, 56, from which the effluent gas is routed to the exhaust port 62 by way of interconnecting flow passage 64 or interconnecting flow passage 66, and eventually vented to the atmosphere.

In some preferred embodiments of the present invention, the valve body is manufactured by a casting process. A casting mold is prepared to form the desired external and internal features and characteristics of the valve body. Molten metal is poured into the casting mold and allowed to cool and solidify. The casting mold is then removed from the cast valve body, and the required finished features and interfaces are machined. This manufacturing process is less costly than manufacturing processes requiring additional machining, and has the advantage that the resultant valve body is lighter in weight than those machined from a solid piece of metal.

While a preferred embodiment is fabricated from cast iron, other embodiments may include any suitable material. For example, various embodiments include steel or other ferrous metals; nonferrous metals such as aluminum, titanium, copper, zinc or brass; or nonmetal materials such as plastics, ceramics, other composite materials, or the like.

In order to facilitate flow in a preferred embodiment, the cornered edges of the intersections between the various interconnecting flow passages, and between the interconnecting flow passages and the various valve chambers are rounded, for example, to radii greater than one-tenth of an inch, with the exception of the periphery of the valve seat surfaces 42, 44, 52, 60. In some embodiments, the casting process allows the formation of aerodynamic internal flow path features and characteristics. Additionally, the angles formed between the centerlines of all intersecting interconnecting flow passages are at least 90 degrees, such that the change in the direction of flow between any two intersecting passages is never greater than 90 degrees.

In some embodiments, the valve body is configured such that the two inlet valve mounting interfaces 38, 40 face opposite each other. Similarly, in some embodiments the two exhaust valve mounting interfaces 46, 54 are coplanar, but in a plane perpendicular to those of the inlet valve mounting interfaces 38, 40. Because in some preferred embodiments each of the four inlet and exhaust valves 12, 14, 16, 18 consist of the same valve subassembly, each of the four corresponding mounting interfaces 38, 40, 46, 54 is capable of receiving an identical valve subassembly. Nonetheless, in other embodiments the valve subassemblies may include differing configurations.

Figure 4:
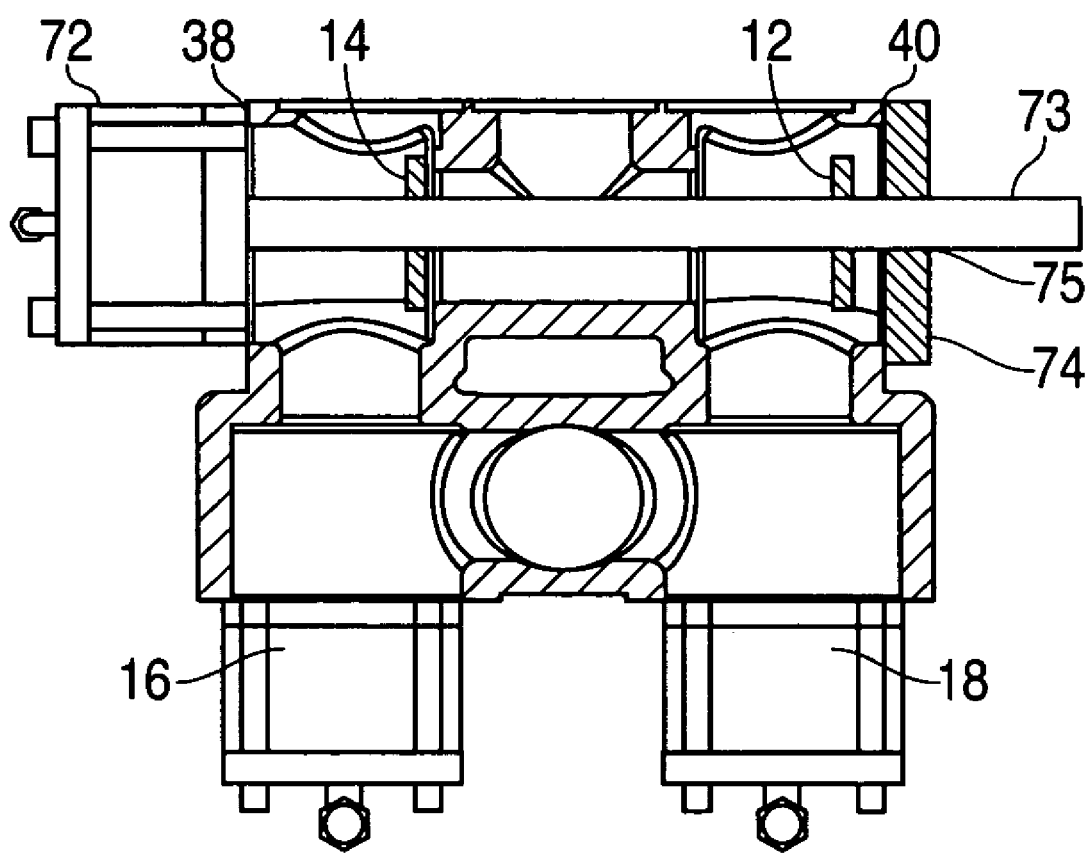
FIG. 4 provides a partial cross-sectional view illustrating a valve assembly with a single inlet valve actuator according to an alternative embodiment of the present invention.

An alternative embodiment of the present invention is illustrated in FIG. 4, which depicts a directional flow control valve assembly 70 with a single inlet valve actuator 72. (Note that FIG. 4 is viewed from the same direction as FIG. 3, also opposite the direction of FIG. 1.) In this embodiment, the first and second inlet valves 12, 14 are attached to a rod 73, which actuates both the first and second inlet valves 12, 14. The inlet valve actuator 72 is attached to mounting interface 38 and coupled to one end of the rod 73, and a face plate 74 is attached to the opposite mounting interface 40. The face plate 74 includes a hole 75 through which the rod 73 passes near its opposite end. Likewise, in other embodiments the actuator 72 is attached to mounting interface 40 and the face plate 74 is attached to mounting interface 38.

In various embodiments of the invention, the directional flow control valve assembly 10 or valve body 20 is scaled to interface with different sizes of inlet manifolds. For example, one embodiment is configured to interface with a nominal one inch inlet manifold. The inlet port 24 and exit ports 30, 32 of this embodiment are nominally one inch in diameter, and the exhaust port 62 is also nominally one inch in diameter. The mating inlet valves 12, 14 and exit valves 16, 18 also are scaled to match the nominal one inch inlet manifold flow. Likewise, the inlet valve chambers 34, 36, exhaust valve chambers 48, 56, and the valve seats 42, 44, 52, 60, as well as all interconnecting flow passages 26, 28, 50, 58, 64, 66 are scaled to match the nominal one inch inlet manifold flow. Other embodiments may be scaled to interface with any size inlet manifold, such as a nominal one-and-a-half inch, nominal two inch, nominal three inch, or any other size inlet manifold.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A directional flow control valve assembly for an adsorbent fractionator, comprising:
    a first inlet valve;
    a second inlet valve;
    a first exhaust valve;
    a second exhaust valve; and
    a valve body, comprising:
        at least one inlet port pneumatically coupled to a first valve chamber and to a second valve chamber;
        a first exit port pneumatically coupled to the first valve chamber;
        a first mounting interface for coupling the first inlet valve to the valve body;
        a second exit port pneumatically coupled to the second valve chamber;
        a second mounting interface for coupling the second inlet valve to the valve body;
        at least one exhaust port pneumatically coupled to a third valve chamber and to a fourth valve chamber;
        a third mounting interface for coupling the first exhaust valve to the valve body;
        a fourth mounting interface for coupling the second exhaust valve to the valve body; and
        a fifth mounting interface for an inlet manifold;
    wherein the third valve chamber is pneumatically coupled to the first valve chamber, the fourth valve chamber is pneumatically coupled to the second valve chamber, and the valve body comprises a single unitary piece.

2. The directional flow control valve assembly of claim 1, wherein the first and second inlet valves are substantially identical to each other.

3. The directional flow control valve assembly of claim 1, wherein the first and second exhaust valves are substantially identical to each other.

4. The directional flow control valve assembly of claim 1, wherein the first and second inlet valves and the first and second exhaust valves are substantially identical to each other.

5. The directional flow control valve assembly of claim 1, wherein a portion of the first valve chamber wall constitutes a first valve seat for the first inlet valve, a portion of the second valve chamber wall constitutes a second valve seat for the second inlet valve, a portion of the third valve chamber wall constitutes a third valve seat for the first exhaust valve, and a portion of the fourth valve chamber wall constitutes a fourth valve seat for the second exhaust valve.

6. The directional flow control valve assembly of claim 1, wherein the second mounting interface faces opposite the first mounting interface.

7. A directional flow control valve assembly for an adsorbent fractionator, comprising:
    a first inlet valve;
    a second inlet valve;
    a first exhaust valve;
    a second exhaust valve; and
    a valve body, comprising:
        at least one inlet port pneumatically coupled to a first valve chamber and to a second valve chamber;
        a first exit port pneumatically coupled to the first valve chamber;
        a first mounting interface for coupling the first inlet valve to the valve body;
        a second exit port pneumatically coupled to the second valve chamber;
        a second mounting interface for coupling the second inlet valve to the valve body;
        at least one exhaust port pneumatically coupled to a third valve chamber and to a fourth valve chamber;
        a third mounting interface for coupling the first exhaust valve to the valve body; and
        a fourth mounting interface for coupling the second exhaust valve to the valve body;
    wherein the third valve chamber is pneumatically coupled to the first valve chamber, the fourth valve chamber is pneumatically coupled to the second valve chamber, the valve body comprises a single unitary piece, and the first and second inlet valves are actuated by a single valve actuator.

8. A directional flow control valve assembly for an adsorbent fractionator, comprising:
    a first inlet valve;
    a second inlet valve;
    a first exhaust valve;
    a second exhaust valve; and
    a valve body, comprising:
        at least one inlet port pneumatically coupled to a first valve chamber and to a second valve chamber;
        a first exit port pneumatically coupled to the first valve chamber;
        a first mounting interface for coupling the first inlet valve to the valve body;
        a second exit port pneumatically coupled to the second valve chamber;
        a second mounting interface for coupling the second inlet valve to the valve body;
        at least one exhaust port pneumatically coupled to a third valve chamber and to a fourth valve chamber;
        a third mounting interface for coupling the first exhaust valve to the valve body; and a fourth mounting interface for coupling the second exhaust valve to the valve body;

wherein the third valve chamber is pneumatically coupled to the first valve chamber, the fourth valve chamber is pneumatically coupled to the second valve chamber, the valve body comprises a single unitary piece, and the third and fourth mounting interfaces are perpendicular to the first and second mounting interfaces, and the third and fourth mounting interfaces lie in a same plane.

9. The directional flow control valve assembly of claim 1, wherein the valve body further comprises a single unitary casting.

10. The directional flow control valve assembly of claim 1, wherein flow communication between the inlet port and the first valve chamber is provided by a first interconnecting passage, flow communication between the inlet port and the second valve chamber is provided by a second interconnecting passage, flow communication between the first exit port and the first valve chamber is provided by a third interconnecting passage, flow communication between the second exit port and the second valve chamber is provided by a fourth interconnecting passage, flow communication between the first valve chamber and the third valve chamber is provided by a fifth interconnecting passage, flow communication between the second valve chamber and the fourth valve chamber is provided by a sixth interconnecting passage, flow communication between the exhaust port and the third valve chamber is provided by a seventh interconnecting passage, and flow communication between the exhaust port and the fourth valve chamber is provided by an eighth interconnecting passage.

11. The directional flow control valve assembly of claim 10, wherein a portion of the first valve chamber wall at the periphery of the first interconnecting passage constitutes a first valve seat for the first inlet valve, a portion of the second valve chamber wall at the periphery of the second interconnecting passage constitutes a second valve seat for the second inlet valve, a portion of the third valve chamber wall at the periphery of the fifth interconnecting passage constitutes a third valve seat for the first exhaust valve, and a portion of the fourth valve chamber wall at the periphery of the sixth interconnecting passage constitutes a fourth valve seat for the second exhaust valve.

12. The directional flow control valve assembly of claim 10, wherein the angled periphery of each of the intersections between the inlet port and the first and second interconnecting passages, between the first valve chamber and the third interconnecting passage, between the third interconnecting passage and the first exit port, between the second valve chamber and the fourth interconnecting passage, between the fourth interconnecting passage and the second exit port, between the first valve chamber and the fifth interconnecting passage, between the fifth interconnecting passage and the third valve chamber, between the second valve chamber and the sixth interconnecting passage, between the sixth interconnecting passage and the fourth valve chamber, and between the exhaust port and the seventh and eighth interconnecting passages is rounded to a radius greater than one-tenth of an inch.

13. The directional flow control valve assembly of claim 10, wherein the angles between the centerlines of all intersecting interconnecting passages are no less than 90 degrees.

14. A valve body for pneumatic directional flow control valves in an adsorbent fractionator, comprising:

at least one inlet port pneumatically coupled to a first valve chamber and to a second valve chamber;

a first exit port pneumatically coupled to the first valve chamber;

a first mounting interface for coupling a first inlet valve to the valve body;

a second exit port pneumatically coupled to the second valve chamber;

a second mounting interface for coupling a second inlet valve to the valve body;

at least one exhaust port pneumatically coupled to a third valve chamber and to a fourth valve chamber;

a third mounting interface for coupling a first exhaust valve to the valve body;

a fourth mounting interface for coupling a second exhaust valve to the valve body;

a fifth mounting interface for an inlet manifold wherein the third valve chamber is pneumatically coupled to the first valve chamber, the fourth valve chamber is pneumatically coupled to the second valve chamber, and the valve body comprises a single unitary piece.

15. The valve body of claim 14, wherein a portion of the first valve chamber wall constitutes a first valve seat for the first inlet valve, a portion of the second valve chamber wall constitutes a second valve seat for the second inlet valve, a portion of the third valve chamber wall constitutes a third valve seat for the first exhaust valve, and a portion of the fourth valve chamber wall constitutes a fourth valve seat for the second exhaust valve.

16. The valve body of claim 14, wherein each the first, second, third and fourth mounting interfaces is capable of accepting a substantially identical valve assembly.

17. A valve body for pneumatic directional flow control valves in an adsorbent fractionator, comprising:

at least one inlet port pneumatically coupled to a first valve chamber and to a second valve chamber;

a first exit port pneumatically coupled to the first valve chamber;

a first mounting interface for coupling a first inlet valve to the valve body;

a second exit port pneumatically coupled to the second valve chamber;

a second mounting interface for coupling a second inlet valve to the valve body;

at least one exhaust port pneumatically coupled to a third valve chamber and to a fourth valve chamber;

a third mounting interface for coupling a first exhaust valve to the valve body; and a fourth mounting interface for coupling a second exhaust valve to the valve body;

wherein the third valve chamber is pneumatically coupled to the first valve chamber, the fourth valve chamber is pneumatically coupled to the second valve chamber, the valve body comprises a single unitary piece wherein the second mounting interface faces opposite the first mounting interface, and the third and fourth mounting interfaces are perpendicular to the first and second mounting interfaces, and the third and fourth mounting interfaces lie in a same plane.

18. The valve body of claim 14, wherein the valve body further comprises a single unitary casting.

19. A valve body for pneumatic directional flow control valves in an adsorbent fractionator, comprising:

means for pneumatically coupling at least one inlet port to a first valve chamber and to a second valve chamber;

means for pneumatically coupling a first exit port to the first valve chamber;

mounting interface means for coupling a first inlet valve to the valve body;
means for pneumatically coupling a second exit port to the second valve chamber;
mounting interface means for coupling a second inlet valve to the valve body;
means for pneumatically coupling at least one exhaust port to a third valve chamber and to a fourth valve chamber;
mounting interface means for coupling a first exhaust valve to the valve body;
mounting interface means for coupling a second exhaust valve to the valve body;
means for pneumatically coupling the third valve chamber to the first valve chamber; and
means for pneumatically coupling the fourth valve chamber to the second valve chamber;
wherein the valve body comprises a single unitary piece and the first and second inlet valves are actuated by a single valve actuator.

20. The valve body of claim 19, further comprising:
first valve chamber wall means for providing a first valve seat for the first inlet valve;
second valve chamber wall means for providing a second valve seat for the second inlet valve;
third valve chamber wall means for providing a third valve seat for the first exhaust valve; and
fourth valve chamber wall means for providing a fourth valve seat for the second exhaust valve.

21. The valve body of claim 19, wherein each of the mounting interface means is capable of accepting a substantially identical valve assembly.

* * * * *